(12) United States Patent
Miyahara

(10) Patent No.: US 8,199,205 B2
(45) Date of Patent: Jun. 12, 2012

(54) SHAKE COMPENSATION DEVICE AND IMAGE PICKUP DEVICE AND OPTICAL DEVICE WHICH INCLUDE THE SHAKE COMPENSATION DEVICE

(75) Inventor: Shinpei Miyahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 12/354,479

(22) Filed: Jan. 15, 2009

(65) Prior Publication Data

US 2009/0185042 A1    Jul. 23, 2009

(30) Foreign Application Priority Data

Jan. 21, 2008   (JP) ................................ 2008-010446

(51) Int. Cl.
*H04N 5/228* (2006.01)
(52) U.S. Cl. .................................................. 348/208.4
(58) Field of Classification Search ............... 348/208.4, 348/208.7, 208.11, 208.2; 396/55
See application file for complete search history.

(56) References Cited

U.S. PATENT DOCUMENTS

| | | | |
|---|---|---|---|
| 5,845,156 A * | 12/1998 | Onuki | 396/52 |
| 6,208,810 B1 * | 3/2001 | Imada | 396/55 |
| 6,374,048 B1 * | 4/2002 | Uenaka et al. | 396/52 |
| 6,630,950 B1 * | 10/2003 | Ohkawara et al. | 348/208.12 |
| 6,940,542 B2 * | 9/2005 | Kitazawa et al. | 348/208.99 |
| 7,742,692 B2 * | 6/2010 | Omi | 396/55 |
| 2008/0088927 A1 * | 4/2008 | Omi | 359/557 |

* cited by examiner

*Primary Examiner* — Jason Chan
*Assistant Examiner* — Gary C Vieaux
(74) *Attorney, Agent, or Firm* — Canon U.S.A., Inc. IP Division

(57) ABSTRACT

A shake compensation device includes a shake detection unit, a driving unit, and a calculation unit. The shake detection unit detects shake direction components of the shake in two different detection axes which are orthogonal to an optical axis, respectively. The driving unit drives a compensation member in directions of two driving axes. The directions of the driving axes are different from directions of the detection axes. The calculation unit calculates driving amounts based on detection result of the shake detection unit to drive the compensation member. The calculation unit performs to restrict a driving range of the compensation member in both directions of the detection axes and the driving axes.

10 Claims, 5 Drawing Sheets

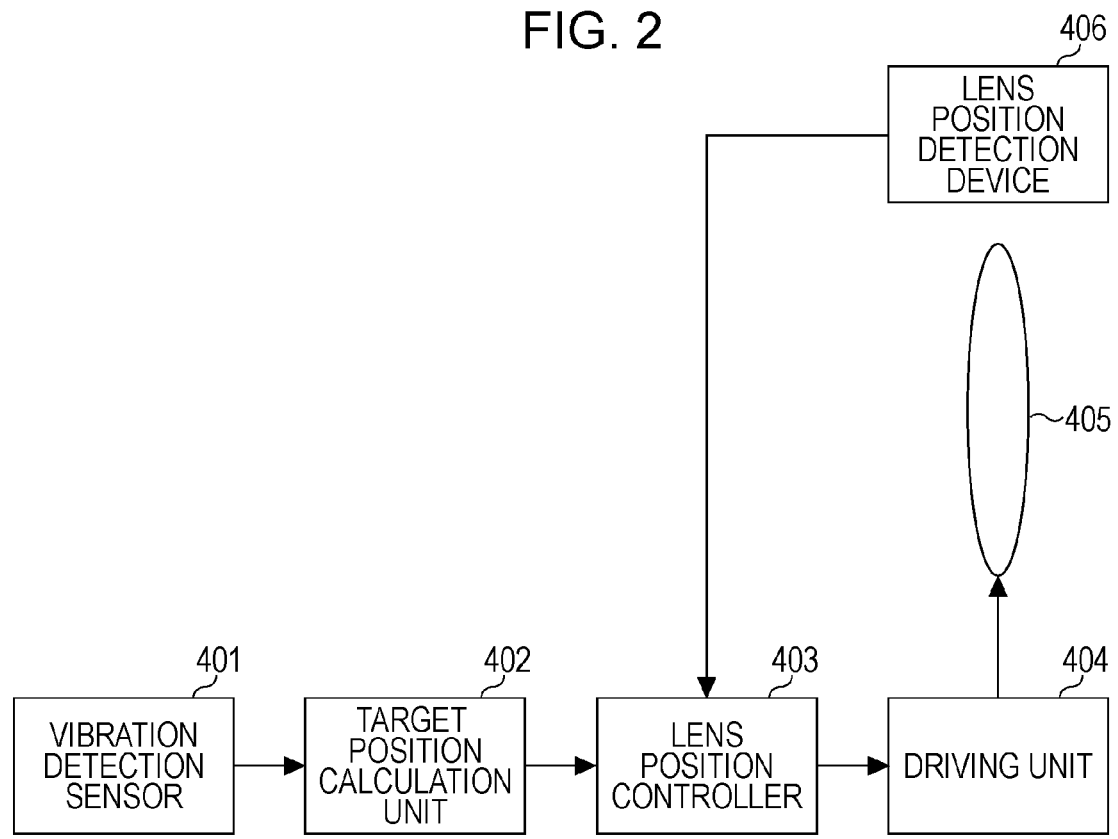
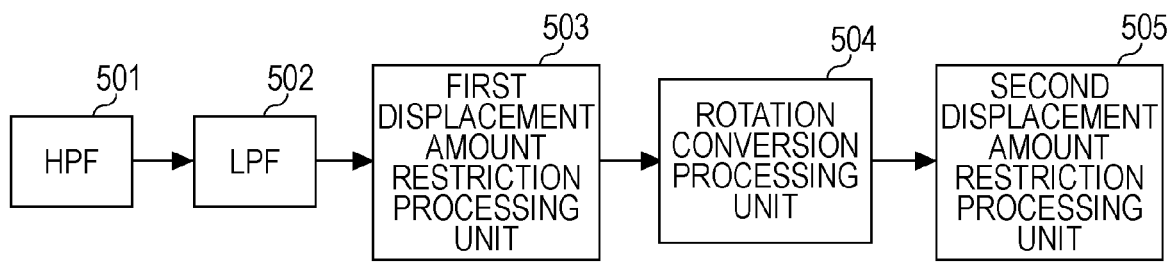

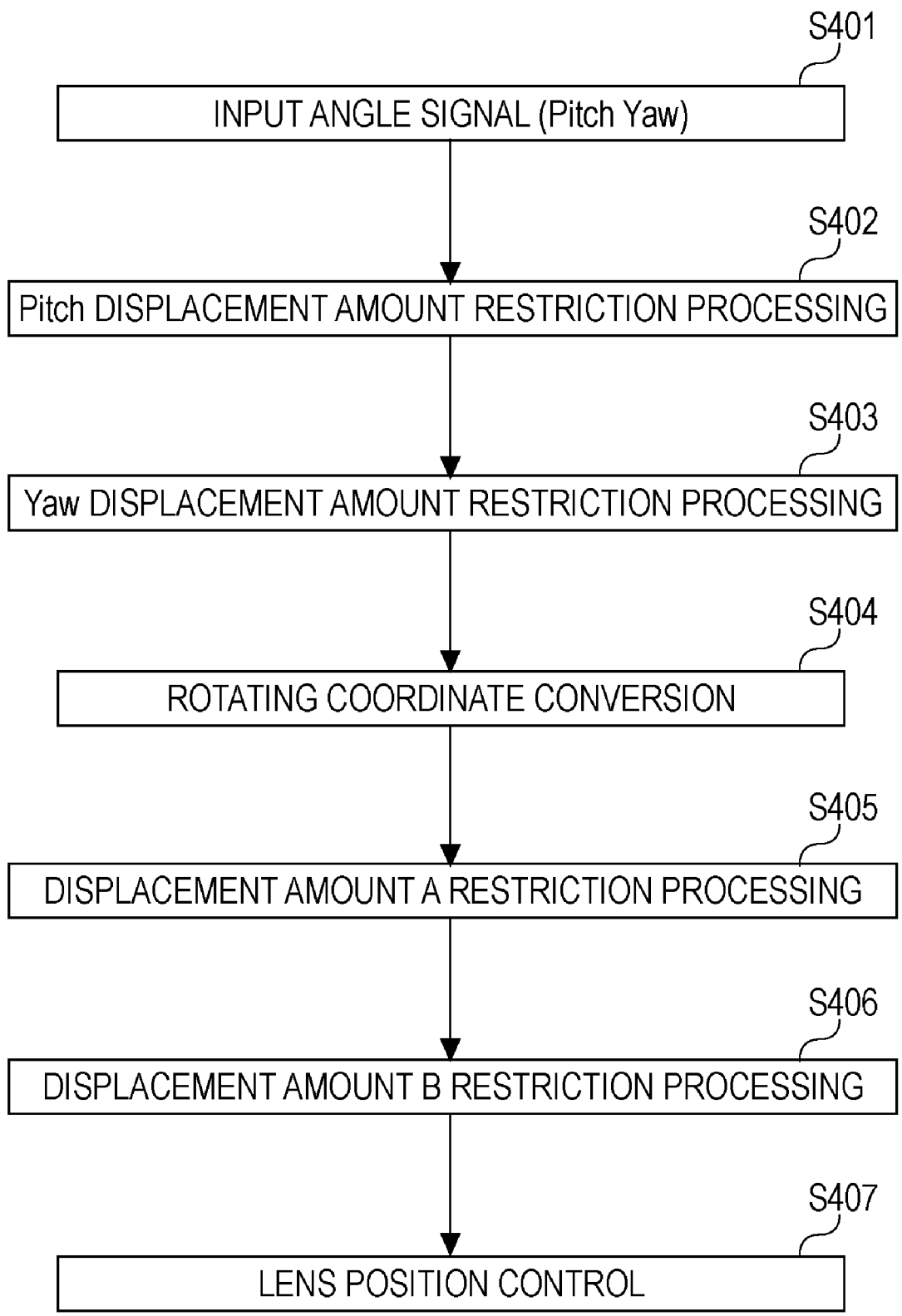

SHAKE COMPENSATION DEVICE AND IMAGE PICKUP DEVICE AND OPTICAL DEVICE WHICH INCLUDE THE SHAKE COMPENSATION DEVICE

BACKGROUND OF THE INVENTION

1. Field of the Invention

The present invention relates to an image-blur correction device having an image-blur correction function, and an image pickup device, such as a digital still camera or a video camera, and an optical device, which include the image-blur correction device.

2. Description of the Related Art

In recent years, techniques of miniaturization, weight reduction, and high-magnification zooming for image pickup devices, such as digital still cameras, have been developed, and an adverse effect of camera-shake has been noted. To address this disadvantage, image pickup devices including a function of correcting image-blur, that is, an image-blur correction function, have been increasingly proposed.

Such image-blur correction functions are roughly categorized into an optical function and an electronic function. In most of the image-blur correction functions, blur is detected using a sensor which detects vibration generated due to camera-shake. On the other hand, in small, light image pickup devices which are attached to cellular phones, for example, an amount of blur is calculated by detecting a motion vector based on a displacement of an image captured using an image-capturing unit.

In the optical image-blur correction, image-blur is corrected by moving a shift lens or an image pickup device in a direction in which an amount of detected blur is cancelled. In the electronic image-blur correction, image-blur is corrected by performing image processing so that an amount of calculated blur is cancelled. Furthermore, an image pickup device having a mechanism in which an axis used for detecting an amount of image-blur and a correction axis (lens driving axis) of a compensation lens used to correct the image-blur are arranged to be rotated so that miniaturization, weight reduction, and high-magnification zooming are achieved has been developed (Refer to Japanese Patent Laid-Open No. 8-152661).

However, as a distance between a lens and the center of an optical axis becomes large, attenuation of light quantity becomes large substantially in proportion to the distance. This causes deterioration of an image. Therefore, a lens-movable range is restricted in a predetermined range. In a lens driving method in the related art, an amount of displacement (an amount of lens driving control) is restricted once with respect to the detection axis or the correction axis so that the lens-movable range has a rectangular shape. FIG. 5A (which will be described hereinafter) shows a state in which an amount of displacement is restricted with respect to a detection axis and a lens-movable range is determined so as to have a rectangular shape.

However, in the lens driving method in the related art, a problem arises in that although a lens is usable in a circular region, the lens is actually movable in a rectangular region. Therefore, when the movable region is included in the circular region which is performance limit of the lens, a large portion (which corresponds to an area obtained by subtracting an area of the rectangular region from the circular region) of the lens usable region is not used.

SUMMARY OF THE INVENTION

The present invention provides an image-blur correction device capable of reducing an unused region in a lens-performance limitation region and attaining a large compensation-lens movable region. Furthermore, the present invention provides an image pickup device or an optical device including the image-blur correction device.

According to an exemplary embodiment of the present invention, there is provided an image-blur correction device including a vibration detection unit configured to detect direction components of two different detection axes in a plane which is orthogonal to an optical axis, a correction unit configured to correct vibration using a correction optical system which is displaced in directions of at least two correction axes different from the detection axes in the plane, a calculation unit configured to calculate amounts of displacements used to drive the correction optical system so that image-blur generated due to the vibrations is corrected in accordance with amounts of vibrations obtained using the vibration detection unit, a coordinate conversion unit configured to rotate the amounts of vibrations in the two detection axes relative to the corresponding two correction axes for conversion through calculations, and a restriction unit configured to restrict a driving range of the correction unit in accordance with a displacement-amount restriction value obtained from a performance limitation region of the correction optical system. The correction unit corrects the vibration in accordance with the restriction of the displacement-amount restriction value.

Further features of the present invention will become apparent from the following description of exemplary embodiments with reference to the attached drawings.

BRIEF DESCRIPTION OF THE DRAWINGS

FIG. 2 is a block diagram illustrating an internal configuration of an image-blur correction processing system according to the exemplary embodiment of the present invention.

FIG. 3 is a block diagram illustrating an internal configuration of a target position calculation unit of FIG. 2.

FIG. 4 is a flowchart illustrating an operation of target position calculation processing according to the exemplary embodiment of the present invention.

DESCRIPTION OF THE EXEMPLARY EMBODIMENTS

Figure 1:
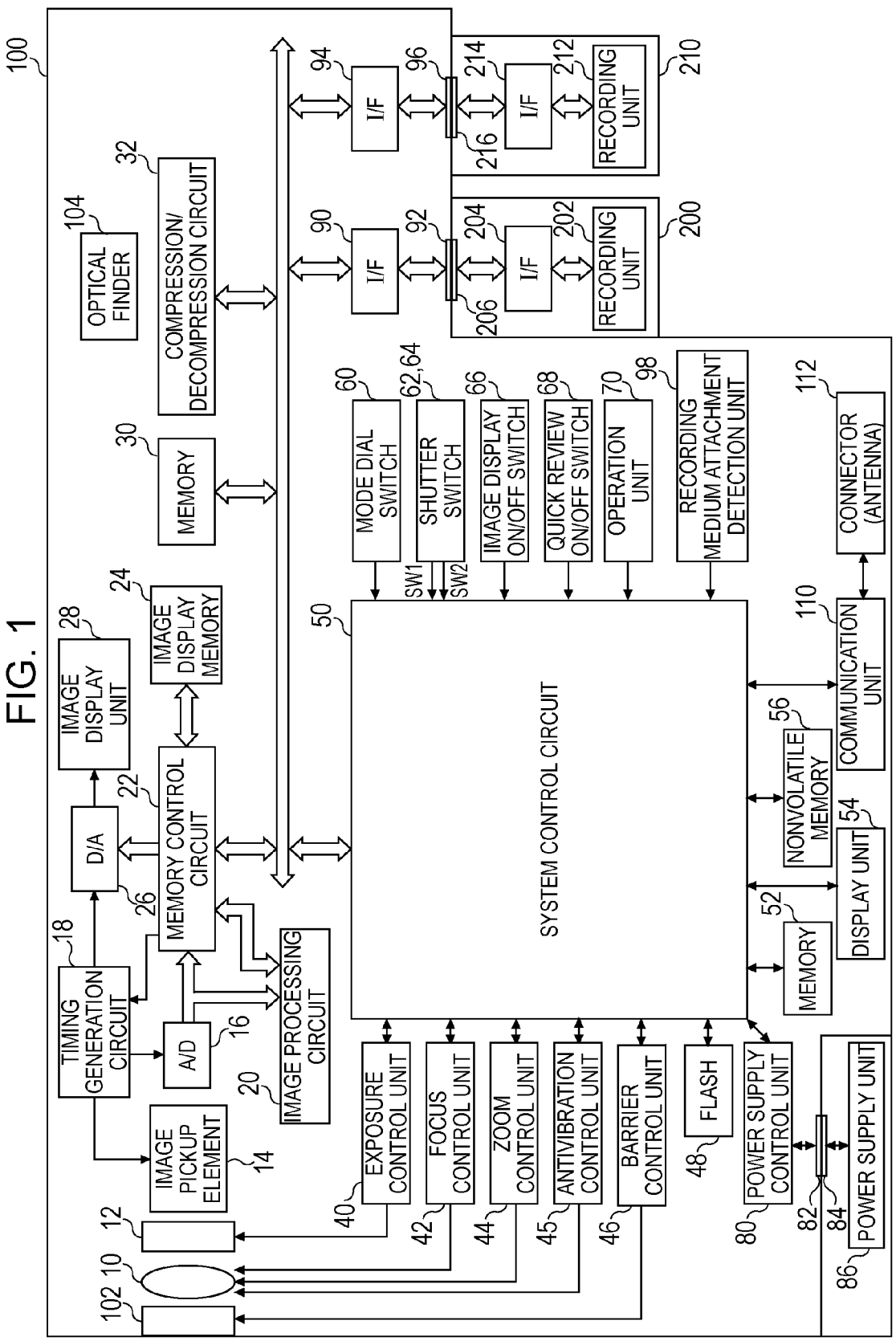
FIG. 1 illustrates an internal configuration of an image pickup device according to an exemplary embodiment of the present invention.

FIG. 1 illustrates a configuration of an image pickup device according to an exemplary embodiment of the present invention. In FIG. 1, an image pickup device 100, such as a digital still camera, includes the following components.

An image pickup lens 10 includes a compensation lens, a shutter 12 includes an aperture function, an image pickup device 14 converts an optical image into an electric signal, and an A/D converter 16 converts an analog signal output from the image pickup device 14 into a digital signal. A timing generation circuit 18 supplies clock signals and control signals to the image pickup device 14, the A/D converter 16, and a D/A converter 26, and is controlled using a memory control circuit 22 and a system control circuit 50.

An image processing circuit 20 performs predetermined pixel compensation processing or predetermined color conversion processing on data supplied from the A/D converter 16 or data supplied from the memory control circuit 22. The image processing circuit 20 performs predetermined calculation processing on image data representing a captured image, and in accordance with a result of the calculation, a system control circuit 50, which will be described hereinafter, controls an exposure control unit 40 and a focus control unit 42. Examples of the predetermined calculation processing include AF (Auto-Focus) processing employing a TTL (Through-The-Lens) method, AE (Auto-Exposure) processing, and EF (flash preliminary emission) processing. The image processing circuit 20 further performs predetermined calculation processing on the image data representing the captured image, and performs AWB (Auto White Balance) processing in accordance with a result of the calculation.

The memory control circuit 22 controls the A/D converter 16, the timing generation circuit 18, the image processing circuit 20, an image display memory 24, the D/A converter 26, a memory 30, and a compression/decompression circuit 32. The A/D converter 16 supplies data to the image display memory 24 or the memory 30 through the image processing circuit 20 and the memory control circuit 22 or only through the memory control circuit 22.

An image display unit 28 includes a TFT (Thin-Film Transistor)-LCD (Liquid Crystal Display), and displays image data which represents an image to be displayed and which has been written in the image display memory 24. The memory 30 stores captured still images and captured moving images, and has storage capacity which is sufficient for storing a predetermined number of still images and a moving image captured over a predetermined period of time. Therefore, the memory 30 is capable of storing a number of images captured by a continuous shooting operation of continuously capturing a plurality of still images or a large image captured as a panoramic photography at high speed. The memory 30 may be used as a workspace for the system control circuit 50.

The compression/decompression circuit 32 compresses and decompresses image data by adaptive discrete cosine transform (ADCT), for example. The compression/decompression circuit 32 reads an image stored in the memory 30, compresses or decompresses the image, and writes the processed data into the memory 30. The exposure control unit 40 controls the shutter 12 having the aperture function, and attains a flash control function by being collaboratively operated with a flash unit 48. The focus control unit 42 controls focusing of the image pickup lens 10. A zoom control unit 44 controls zooming of the image pickup lens 10. An image stabilizing control unit 45 is used to correct image-blur. A barrier control unit 46 controls operation of a barrier 102 serving as a protection unit. The flash unit 48 has a function of projecting AF auxiliary light and a flash control function.

As described above, the exposure control unit 40 and the focus control unit 42 are controlled by the TTL method. Specifically, in accordance with a result of the calculation performed on image data representing a captured image using the image processing circuit 20, the system control circuit 50 controls the exposure control unit 40 and the focus control unit 42.

The system control circuit 50 controls operation of the image pickup device 100. A memory 52 stores constants, variables, and programs, for example, of the system control circuit 50. A display unit 54 is constituted by a speaker and a liquid crystal display device which displays operation states and messages using text, images, and audio, for example, in accordance with an operation of a program executed using the system control circuit 50. Specifically, a single display unit 54 is installed in a single portion where a user can easily view the display unit 54 or a plurality of display units 54 are installed where the user can easily view the display units 54. The display unit 54 is constituted by a combination of an LCD, an LED (Light Emitting Diode), and a sounding element, for example. Part of a function of the display unit 54 is included in an optical finder 104.

The display unit 54 displays an image which distinguishes single-shot and continuous-shooting, an image representing a self-timer, an image representing a compression rate, an image representing the number of recording pixels, an image representing the number of recorded images, and an image representing the remaining allowable number of images, for example. Furthermore, the display unit 54 displays an image representing a shutter speed, an image representing an aperture value, an image representing exposure correction, an image representing a state of flash, an image representing red-eye-effect-reduction, an image representing a macro photography, an image representing a buzzer setting, an image representing an amount of remaining battery for a clock, an image representing an amount of remaining battery, and an image representing an error. Furthermore, the display unit 54 displays a number having a plurality of digits which represents information, an image representing an attachment state of a recording medium 200 or 210, an image representing operation of a communication I/F, and date and time. Among the images displayed in the display unit 54, an image representing a focal point, an image alarming camera-shake, an image representing necessity of charging of the flash unit 48, the image representing a shutter speed, the image representing the aperture value, and the image representing exposure correction are displayed in the optical finder 104.

An electrically erasable and recordable nonvolatile memory 56 includes an EEPROM (Electronically Erasable and Programmable Read Only Memory). A mode dial switch 60, a shutter switch SW1 62, a shutter switch SW2 64, an image display on/off switch 66, a quick review on/off switch 68, and an operation unit 70 are operation blocks used to input various instructions of the system control circuit 50. The operation blocks include a pointing device utilizing a switch, a dial, a touch panel, and visual-line sensing and a sound recognition device and a combination thereof.

The operation blocks will be described in detail hereinafter. The mode dial switch 60 switches function modes from one to another. The function modes include a power off mode, an automatic photographing mode, a photographing mode, a panoramic photographing mode, a reproducing mode, a multi-screen reproducing/deleting mode, and a PC connection mode. The shutter switch SW1 62 is turned on while a shutter button (not shown) is operated so as to instruct start of operation of the AF processing, the AE processing, the AWB processing, or the EF processing. The shutter switch SW2 64 is turned on after the operation of the shutter button (not shown) is completed. Upon completion of an operation by turning on shutter switch SW2 64, instructions are issued as follows: instruction for start of exposure processing of converting a signal output from the image pickup element 14 into image data through the A/D converter 16 and supplying the image data through the memory control circuit 22 to the memory 30; instruction for developing processing performed through calculations using the image processing circuit 20 and the memory control circuit 22; and instruction for recording processing of reading the image data from the memory 30, compressing the image data using the compression/decompression circuit 32, and writing the image data to the recording medium 200 or the recording medium 210.

The image display on/off switch 66 has a function of turning on or off the image display unit 28. With this function, since a current to be supplied to the image display unit 28 constituted by the TFT-LCD is blocked when a photographing operation is performed using the optical finder 104, reduction of power consumption is attained.

The quick review on/off switch 68 is used to set a quick review function of automatically reproducing data representing a captured image immediately after the image is captured. Note that, in this embodiment, the quick review on/off switch 68 sets the quick review function when the image display unit 28 is turned off.

The operation unit 70 includes various buttons and a touch panel. The various buttons include a menu button, a setting button, a macro-photographing button, a multi-screen reproducing page-break button, a flash setting button, and a single shooting/continuous shooting/self-timer switching button. Furthermore, the various buttons include a menu-change-plus button, a menu-change-minus button, a reproducing-image-change-plus button, a reproducing-image-change-minus button, a photographing image quality selection button, an exposure correction button, and a date-and-time setting button.

A power supply control unit 80 includes a battery detection circuit, a DC-DC converter, and a switch circuit used to switch blocks to which current is to be supplied from one to another. The power supply controller 80 detects whether a battery is attached, a type of the battery, and an amount of remaining battery. Furthermore, the power supply controller 80 controls the DC-DC converter in accordance with results of the detections and an instruction supplied from the system control circuit 50, and supplies a required voltage for a required period of time to the various units including the recording media.

A power supply unit 86 includes a primary battery such as an alkaline battery or a lithium battery, a secondary battery such as an NiCd battery, an NiMH battery, or an Li battery, and an AC adapter. Connectors 82 and 84 connect the power supply unit 86 to the power supply control unit 80. Interfaces 90 and 94 are used for a recording medium such as a memory card or a hard disk. Connecters 92 and 96 are used for connection with the memory card or the hard disk. A recording medium attachment detection unit 98 detects whether the recording medium 200 or the recording medium 210 is connected to the connector 92 or the connecter 96.

Note that although the two interfaces and the two connectors are used for attachment of the recording media in this exemplary embodiment, a single interface and a single connecter may be arranged or a plurality of interfaces and a plurality of connecters may be arranged for connection of a recording medium or recording media. Furthermore, a combination of an interface and a connecter which comply with different standards may be arranged. The interface and the connector may comply with a standard of a PCMCIA (Personal Computer Memory Card International Association) card or a CF (Compact Flash) card, for example. When the interfaces 90 and 94 and the connecters 92 and 96 are configured so as to comply with the standard of the PCMCIA or the CF card, various communication cards such as a LAN card, a modem card, a USB card, an IEEE1394 card, a P1284 card, an SCSI card, and a communication card for a PHS (Personal Handyphone System) can be connected through the interfaces 90 and 94 and the connecters 92 and 96. When the connection is established, image data and management information associated with the image data can be transmitted between the image pickup device 100 and a computer or a peripheral such as a printer.

The barrier 102 prevents an image pickup unit including the image pickup lens 10 of the image pickup device 100 from being contaminated or damaged by covering the image pickup unit. The optical finder 104 enables a photographing operation without using the electronic finder function of the image display unit 28. The optical finder 104 includes part of the functions of the display unit 54, such as the display of the focal point, the display of the image alarming a blur, the display of the image representing necessity of charging for the flash unit, the display of the image representing a shutter speed, the display of the aperture value, and the display of the image representing exposure correction.

A communication unit 110 has various communication functions, such as, an RS232C, a USB, an IEEE1394, a P1284, a SCSI, a modem, a LAN, and a wireless communication. A connector 112 is used to connect the image pickup device 100 to another apparatus through a communication unit 110 in a wired manner, and serves as an antenna in a wireless communication.

The recording medium 200 is a memory card or a hard disk, for example, and is attachable to the image pickup device 100. The recording medium 200 includes a recording unit 202 such as a semiconductor memory or a magnetic disk, an interface 204 used to connect the recording medium 200 to the image pickup device 100, and a connector 206 used to connect the recording medium 200 to the image pickup device 100. Similarly, the recording medium 210 includes a recording unit 212 such as a semiconductor memory or a magnetic disk, an interface 214 used to connect the recording medium 210 to the image pickup device 100, and a connector 216 used to connect the recording medium 210 to the image pickup device 100.

FIG. 2 is a block diagram illustrating an internal configuration of an image-blur correction processing system including the image stabilizing control unit 45 and other peripheral units included in the image pickup device 100 according to the exemplary embodiment of the present invention.

The image-blur correction processing system includes a vibration detection sensor 401, a target position calculation unit 402, a lens position controller 403, a driving unit 404, a compensation lens 405, and a lens position detection device 406.

The vibration detection sensor 401 corresponds to an angular velocity sensor and detects shake (vibration) of the image pickup unit (entire image pickup device) generated due to camera-shake and converts the detected vibration into an electric signal and sends the signal to the target position calculation unit 402. The target position calculation unit 402 calculates an amount of displacement of the lens which can sufficiently cancel image-blur generated due to the camera-shake in accordance with the supplied electric signal. The amount of displacement is supplied to the lens position controller 403, and in accordance with the amount of displacement, the driving unit 404 drives the compensation lens 405. A position of the compensation lens 405 is detected using the lens position detection device 406, and a signal representing the position is fed back to the lens position controller 403, and then, the lens position controller 403 performs lens position control. In this way, image-blur correction is performed.

FIG. 3 is a block diagram illustrating an internal configuration of the target position calculation unit 402 of FIG. 2. The target position calculation unit 402 includes an HPF (High-Pass Filter) 501, an LPF (LowPass Filter) 502, a first displacement-amount restriction processing unit 503, a rotation coordinate conversion unit 504, and a second displacement-amount restriction processing unit 505.

The HPF 501 cuts DC components included in an angular velocity signal supplied from the vibration detection sensor 401. After the DC component is cut, the signal is supplied to the LPF 502. The LPF 502 corresponds to an integrator used to convert the angular velocity signal into an angular signal. The LPF 502 starts integration processing in a state where the compensation lens 405 is in the center of an optical axis, and accordingly, the angular signal which has been subjected to the integration processing represents an angle relative to the optical axis. Furthermore, here, since the angular velocity signal is multiplied by a zooming position obtained using the zoom control unit 44 and a coefficient determined in accordance with a size of the image pickup device 14, the angular velocity signal is converted into an amount of displacement relative to the center of the optical axis which is a target position of the compensation lens 405. Then, the signal converted into the amount of displacement is supplied to the first displacement-amount restriction processing unit 503. The first displacement-amount restriction processing unit 503 performs displacement-amount restriction processing on the basis of a lens-displacement-amount restriction value obtained using a radius of a predetermined lens performance limitation circle. Specifically, when the converted amount of displacement is larger than the lens-displacement-amount restriction value, the amount of displacement is reduced to the lens-displacement-amount restriction value. In this way, the restriction processing is performed.

The rotation coordinate conversion unit 504 performs rotation coordinate conversion, which will be described hereinafter, on an amount of displacement in a Pitch direction and an amount of displacement in a Yaw direction relative to directions of correction axes. As with the first displacement-amount restriction processing unit 503, the second displacement-amount restriction processing unit 505 performs displacement-amount restriction processing on the basis of a lens-displacement-amount restriction value obtained using a radius of the predetermined lens performance restriction circle. Note that since the lens which is symmetrical about the optical axis is employed in this exemplary embodiment, portions of the lens which are equally far from the optical axis have same lens performance. Therefore, the lens-displacement-amount restriction value obtained using the radius of the lens performance limitation circle employed in the first displacement-amount restriction processing unit 503 is the same as that employed in the second displacement-amount restriction processing unit 505.

A sequence of operations in the configuration shown in FIG. 3 will be described with reference to image drawings in FIGS. 4 and 5A-5C. Note that it is assumed that detection axes are shifted by 45 degrees with respect to corresponding correction axes hereinafter.

As described above, the DC component of the angular velocity signal obtained from the vibration detection sensor 401 is cut using the HPF 501, and the angular velocity signal is integrated using the LPF 502 arranged in the next stage so that an angular signal is obtained, and is converted into an amount of displacement. In this way, angular velocity signals obtained for the individual detection axes, that is, the Pitch direction and the Yaw direction are independently subjected to integration/conversion processing, to obtain amounts of displacements corresponding to the directions. This operation corresponds to an operation of obtaining amounts of displacements performed in step S401 of FIG. 4.

Figure 5A:
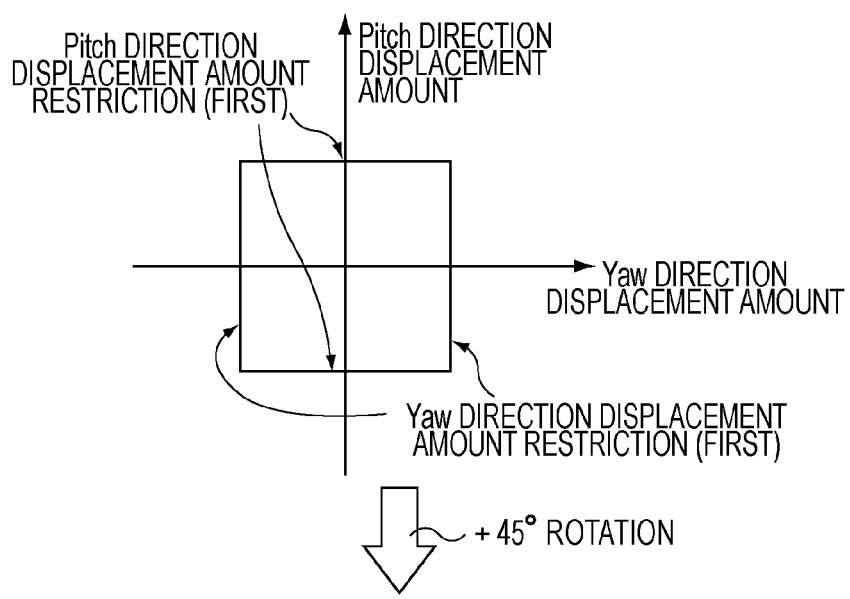
FIGS. 5A to 5C are image diagrams illustrating the operation of the processing shown in FIG. 4.
Figure 5B:
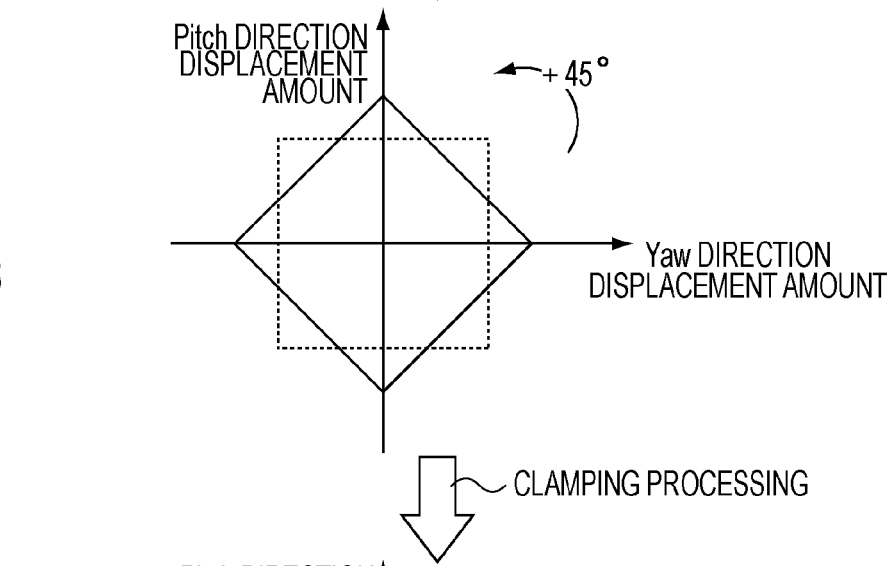

Subsequently, in the first displacement-amount restriction processing performed in step S402 and step S403, first, displacement-amount restriction processing is performed on the amounts of displacements in the Pitch direction and the Yaw direction which serve as the detection axes (refer to FIG. 5A). Subsequently, in step S404, the rotation coordinate conversion is performed on the amount of displacement in the Pitch direction and the amount of displacement in the Yaw direction which have been subjected to the first displacement-amount restriction processing relative to the actual correction axes (refer to FIG. 5B). Here, equations (1) of 45-degree-rotation coordinate conversion are expressed as follows.

$$A = P\cos(\pi/4) - Y\sin(\pi/4)$$

$$B = P\sin(\pi/4) + Y\cos(\pi/4) \quad (1)$$

Note that P denotes the amount of displacement in the Pitch direction which has been subjected to the first displacement-amount restriction processing, Y denotes the amount of displacement in the Yaw direction which has been subjected to the first displacement-amount restriction processing, A denotes a value obtained after the amount of displacement in the Yaw direction is rotated by 45 degrees with respect to the center of a coordinate, and B denotes a value obtained after the amount of displacement in the Pitch direction is rotated by 45 degrees with respect to the center of the coordinate.

Figure 5C:
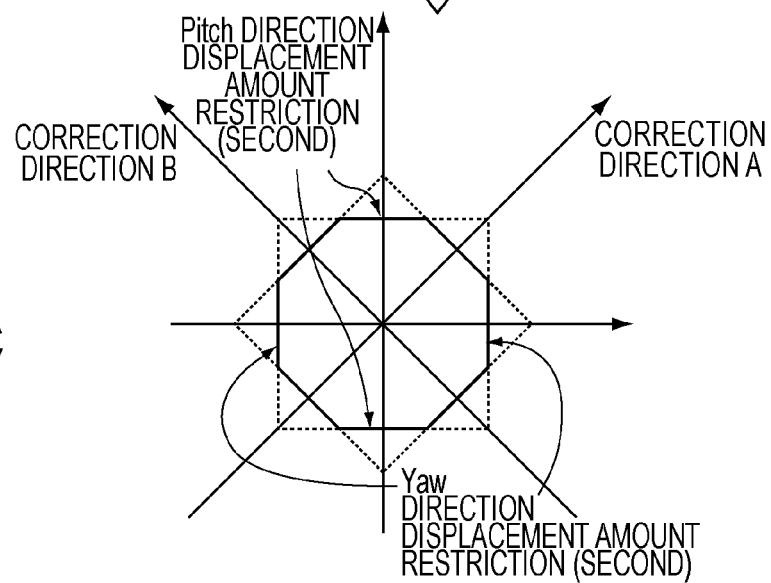

Subsequently, in step S405 and step S406, second displacement-amount restriction processing is performed on the amounts of displacements which have been subjected to the rotation coordinate conversion (refer to FIG. 5C). As described above, a displacement-amount restriction value the same as that used in the first displacement-amount restriction processing is used here.

After the processing is terminated and final amounts of displacements of the individual axes are obtained, the amounts of displacements are supplied to the lens position controller 403 shown in FIG. 3 in step S407.

As described above, since the first displacement-amount restriction processing and the second displacement-amount restriction processing are performed, the lens movable range corresponding to an octagon region circumscribed in the lens performance limitation circle is obtained.

Figure 6:
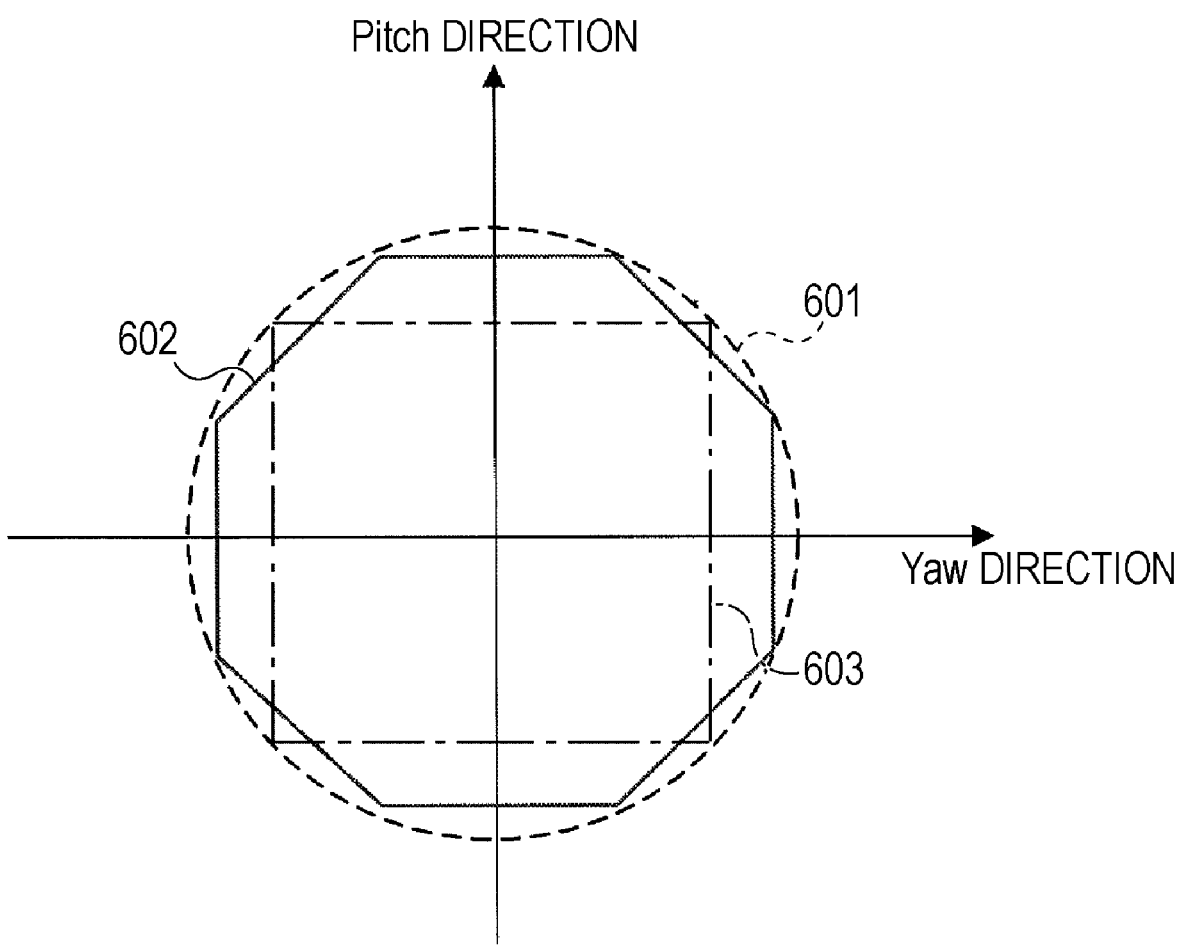
FIG. 6 is an image diagram illustrating a lens-movable range according to the exemplary embodiment of the present invention.

FIG. 6 is an image diagram illustrating the lens-movable range according to the exemplary embodiment of the present invention. A lens performance limitation end which has a radius of lens performance limitation circle is denoted by a circle 601 represented by a dashed line, and a region defined through the first displacement-amount restriction processing and the second displacement-amount restriction processing is denoted by an octagon region 602 represented by a solid line. A circumference of the octagon region 602 corresponds to a driving limitation end. That is, the compensation lens 405 is driven so that the center of the compensation lens 405 is positioned within this region. Here, as with the related art, in a case where displacement-amount restriction processing is performed only once in the directions of the detection axes, a periphery of a square region 603 denoted by a dashed-dotted line corresponds to the driving limitation end, and the square region 603 is smaller than the octagon region 602. That is, in the case where the displacement-amount restriction processing is performed only once, the smaller lens-displacement-amount restriction value should be set when compared with a case where the displacement-amount restriction processing is performed twice, as with this exemplary embodiment. Accordingly, as described in this exemplary embodiment, since the restriction processing is performed twice along with the rotation processing, the movable range of the compensation lens 405 is defined as the region having an octagon shape which is circumscribed in the circle. Accordingly, an unused region in a lens-performance limitation region can be reduced. Note that the relationship between the lens-performance limitation circle and the octagon region which is the movable range of the compensation lens 405 is defined as follows. The octagon region may be circumscribed in the circle or the octagon region may be circumscribed by the circle as long as the lens performance is not deteriorated.

In the foregoing exemplary embodiment, the description is made taking the image-blur correction device employed in an image pickup device, such as a digital still camera, as an example. However, application of the present invention is not limited to the digital still camera since the present invention can integrated as a small stable system. Alternatively, the present invention may be applied to binocular glasses, digital video cameras, monitoring cameras, Web cameras, and mobile terminals such as cellular phones. Furthermore, the present invention may be applied to polarized-light devices including optical devices such as steppers and applied to optical-axis rotation device for aberration correction.

Note that to realize the present invention, a recording medium including program code of software which realizes functions of the foregoing exemplary embodiments may be installed in a system or an apparatus, and a computer (or a CPU or an MPU) included in the system or the apparatus reads and executes the program code stored in the recording medium. Furthermore, the functions of the foregoing exemplary embodiment may be realized by performing part of or entire processing using an OS (Operating System), for example, operating in the computer in response to instructions of the program code.

Furthermore, the program code read from the recording medium may be written to a memory included in a function expansion board inserted into the computer or a memory included in a function expansion unit connected to the computer. In this case, the functions of the foregoing exemplary embodiment are realized by performing part of or entire processing using a CPU, for example, included in the function expansion board or the function expansion unit in response to instructions of the written program code.

When the present invention is applied to the storage medium, the storage medium stores the program code corresponding to the procedure described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-010446 filed Jan. 21, 2008, which is hereby incorporated by reference herein in its entirety.

What is claimed is:

1. A shake compensation device, comprising;
a shake detection unit configured to detect shake direction components of the shake in two different detection axes which are orthogonal to each other and to an optical axis respectively;
a driving unit configured to drive a compensation member in directions of two driving axes, wherein the directions of the driving axes are orthogonal to each other, and different from directions of the detection axes and wherein one of the driving axes of the driving unit is shifted by 45 degrees with respect to one of the detection axes of the shake detection unit; and
a calculation unit configured to calculate driving amounts based on detection result of the shake detection unit to drive the compensation member and to perform to restrict a driving range of the compensation member in both directions of the detection axes and the driving axes;
wherein the calculation unit comprises;
a displacement-amount calculation unit which calculates displacement-amounts based on the detection result of the shake detection unit;
a first limitation performance unit which limits the calculated displacement-amounts not to exceed first predetermined amounts;
a conversion unit which converts the displacement-amounts into the driving amounts, a rotation angle of conversion being 45 degrees; and
a second limitation performance unit which limits the converted driving amounts not to exceed second predetermined amounts,
wherein the calculation unit restricts the driving range of the compensation member so that the driving range is included in the performance limitation region of an optical system, and when the performance limitation range of the optical system has a circular shape, the calculation unit obtains a displacement-amount restriction value using a radius of a performance limitation circle of the optical system, and restricts the driving range of the compensation member within an octagon region which is circumscribed by the performance limitation circle of the optical system.

2. An image pickup device including the shake compensation device according to claim 1.

3. An optical device including the shake compensation device according to claim 1.

4. A shake compensation method, comprising:
detecting shake direction components of the shake in two different detection axes in a plane which are orthogonal to each other and to an optical axis respectively;
compensating shake using a compensation member in directions of two driving axes, wherein the directions of the driving axes are orthogonal to each other, and different from directions of the detection axes and wherein one of the driving axes is shifted by 45 degrees with respect to one of the detection axes;
calculating driving amounts based on the shake detecting result to drive compensation member and restricting the driving range of the compensation member so that the driving range is included in the performance limitation region of an optical system;
performing restricting a driving range of the compensation member in directions to both the directions of the detection axes and the directions of the driving axes;
calculating displacement-amounts based on the detection result of the shake detection unit;
performing to limit the calculated displacement-amounts not to exceed first predetermined amounts;
converting the displacement-amounts into the driving amounts, a rotation angle of the conversion is 45 degrees; and
a second limitation performance unit which limits the converted driving amounts not to exceed second predetermined amounts;
wherein, when the performance limitation range of the optical system has a circular shape, obtaining a displacement-amount restriction value using a radius of a performance limitation circle of the optical system, and restricting the driving range of the compensation member within an octagon region which is circumscribed by the performance limitation circle of the optical system.

5. A shake compensation device, comprising;
a shake detection unit configured to detect direction components of two different detection axes in a plane which is orthogonal to an optical axis;
a correction unit configured to correct shake using a correction optical system which is displaced in directions of at least two correction axes in the plane, the directions of the correction axes being different from directions of the detection axes;
a calculation unit configured to calculate amounts of displacements used to drive the correction optical system so that image-blur generated due to shakes is corrected in accordance with amounts of shakes obtained using the shake detection unit;
a coordinate conversion unit configured to rotate the amounts of shakes in the two detection axes relative to the corresponding at least two correction axes for conversion through calculations; and
a restriction unit configured to restrict a driving range of the correction unit in accordance with a displacement-amount restriction value obtained from a performance limitation region of the correction optical system;
wherein the correction unit corrects the shake in accordance with the restriction of the displacement-amount restriction value,
wherein one of the detection axes of the shake detection unit is shifted by 45 degrees with respect to one of the correction axes of the correction unit, and a rotation angle of the coordinate conversion is 45 degrees, and
wherein when the performance limitation range of the correction optical system has a circular shape, the restriction unit obtains the displacement-amount restriction value using a radius of a performance limitation circle of the correction optical system, and restricts the driving range of the correction unit within an octagon region which circumscribes the performance limitation circle of the correction optical system.

6. A shake compensation device, comprising;
a shake detection unit configured to detect direction components of two different detection axes in a plane which is orthogonal to an optical axis;
a correction unit configured to correct shake using a correction optical system which is displaced in directions of at least two correction axes in the plane, the directions of the correction axes being different from directions of the detection axes;
a calculation unit configured to calculate amounts of displacements used to drive the correction optical system so that image-blur generated due to shakes is corrected in accordance with amounts of shakes obtained using the shake detection unit;
a coordinate conversion unit configured to rotate the amounts of shakes in the two detection axes relative to the corresponding at least two correction axes for conversion through calculations; and
a restriction unit configured to restrict a driving range of the correction unit in accordance with a displacement-amount restriction value obtained from a performance limitation region of the correction optical system,
wherein the correction unit corrects the shake in accordance with the restriction of the displacement-amount restriction value, and
wherein when the performance limitation range of the correction optical system has a circular shape, the restriction unit obtains the displacement-amount restriction value using a radius of a performance limitation circle of the correction optical system, and restricts the driving range of the correction unit within an octagon region which is circumscribed by the performance limitation circle of the correction optical system.

7. An image pickup device including the shake compensation device according to claim 5.

8. An optical device including the shake compensation device according to claim 5.

9. An image pickup device including the shake compensation device according to claim 6.

10. An optical device including the shake compensation device according to claim 6.

* * * * *